US007354027B2

(12) United States Patent
Mennicken et al.

(10) Patent No.: US 7,354,027 B2
(45) Date of Patent: Apr. 8, 2008

(54) BOUNCE-FREE MAGNET ACTUATOR FOR INJECTION VALVES

(75) Inventors: Michael Mennicken, Wimsheim (DE); Joachim Boltz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/538,915

(22) PCT Filed: Dec. 12, 2003

(86) PCT No.: PCT/DE03/04111

§ 371 (c)(1), (2), (4) Date: Jun. 13, 2005

(87) PCT Pub. No.: WO2004/055357

PCT Pub. Date: Jul. 1, 2004

(65) Prior Publication Data

US 2006/0113503 A1 Jun. 1, 2006

(30) Foreign Application Priority Data

Feb. 13, 2003 (DE) ................................ 103 05 985
Dec. 13, 2003 (DE) ................................ 102 58 442

(51) Int. Cl.
*F16K 31/00* (2006.01)

(52) U.S. Cl. ................. 251/64; 251/129.16; 239/585.3

(58) Field of Classification Search .................. 251/64, 251/129.15, 129.16; 239/585.1, 585.2, 585.3, 239/585.4, 585.5
See application file for complete search history.

(56) References Cited

U.S. PATENT DOCUMENTS

| | | | | |
|---|---|---|---|---|
| 5,238,224 | A | 8/1993 | Horsting | |
| 5,634,596 | A | 6/1997 | Abiko | |
| 5,918,818 | A | 7/1999 | Takeda | |
| 5,944,053 | A * | 8/1999 | Kabierschke et al. | 137/625.29 |
| 6,764,061 | B2 * | 7/2004 | Haeberer et al. | 251/129.16 |
| 6,848,669 | B2 * | 2/2005 | Makino | 251/129.15 |

FOREIGN PATENT DOCUMENTS

| | | |
|---|---|---|
| JP | 11-44275 | 2/1999 |
| WO | WO 93/07382 A1 | 4/1993 |

* cited by examiner

*Primary Examiner*—John K Fristoe, Jr.
(74) *Attorney, Agent, or Firm*—Ronald E. Greigg

(57) ABSTRACT

The invention relates to a magnet valve for actuating a fuel injector, having a magnet core and magnet coil received in the core. A closing spring acts on the magnet armature in the closing direction. An outlet gap for an actuating fluid is formed between a face end of the stop sleeve, oriented toward the magnet armature, and the magnet armature itself. The outlet gap discharges into a hydraulic damping chamber, which is defined by a face end of the magnet armature and by a damping face of the non-magnetic material.

20 Claims, 4 Drawing Sheets

BOUNCE-FREE MAGNET ACTUATOR FOR INJECTION VALVES

CROSS-REFERENCE TO RELATED APPLICATIONS

This application is a 35 USC 371 application of PCT/DE 03/04111 filed on Dec. 12, 2003.

BACKGROUND OF THE INVENTION

1. Field of the Invention

In fuel injection valves, actuators are used, such as piezoelectric actuators or magnet valves. Triggering the actuators initiates a pressure relief of a control chamber, causing an injection valve to open, so that fuel can be injected into the combustion chamber of an internal combustion engine. However, magnet valves have the property of tending to bounce, and as a result the performance graph for the quantity, that is, the injection quantity, can vary so much relative to the triggering time that it is only conditionally suitable for reproduction or for compensation functions.

2. Description of the Prior Art

European Patent Disclosure EP 0 562 046 B1 discloses an actuation and valve assembly with damping for an electronically controlled injection unit. The actuation and valve assembly for a hydraulic unit has an electrically excitable electromagnet assembly with a fixed stator and a movable armature. The armature includes a first and a second surface defining a first and second hollow chamber, and the first surface of the armature is oriented toward the stator. A valve connected to the armature is capable of carrying a hydraulic actuating fluid from a sump to the injection system. A damping fluid can be collected there relative to one of the hollow chambers of the electromagnet assembly and drained away from there again. By means of a region of a valve needle protruding into a central bore, the fluidic communication of the damping fluid can be selectively opened and closed in proportion to the viscosity of this fluid.

German Patent Disclosure DE 101 23 910.6 pertains to a fuel injection system used in an internal combustion engine in which the combustion chambers are supplied with fuel via fuel injectors. The fuel injectors are acted upon in turn via a high-pressure source; moreover, the fuel injection system includes a pressure booster which has a movable pressure booster piston. This piston divides a chamber that can be connected to the high-pressure source from a high-pressure chamber that communicates with the fuel injector. The high fuel pressure in the high-pressure chamber can be varied, by filling a back chamber of a pressure boosting device or by evacuating fuel from this back chamber of the fuel booster.

In magnet valves of the prior art, the stroke length is defined by stop sleeves, to name one example. In addition, in magnet valves that have two seats, the stroke of the magnet valve can be defined by the two seats. In such magnet valves, bouncing can occur at the first, upper seat. The same is true for a valve that is open when without current and that has only one seat. If stop sleeves are received in the magnet core, they surround a closing spring that acts on the magnet armature. By means of a stop sleeve, the precise adjustment of a remanent air gap between the magnet core and the magnet armature, or its armature plate, can be accomplished. In fast opening of the magnet valve, which is desired, the armature comes to strike one face end of the stop sleeve, which is called armature bouncing. The armature bouncing on the stop sleeve has effects on the quantity performance graph, or in other words the injection quantity of fuel, relative to the triggering duration of a magnet coil of a magnet valve that actuates a fuel injector. In some applications, the effects of armature bouncing on the quantity performance graph are wanted, such as if a preinjection quantity plateau is desired for a phase of preinjection into the combustion chamber. However, in conjunction with regulating a preinjection quantity, as will be needed for fuel injection systems expected in the future, a quantity performance graph that has a preinjection quantity plateau is extremely unfavorable.

SUMMARY OF THE INVENTION

With the embodiment proposed according to the invention, the armature bouncing that affects the quantity performance graph of a fuel injector is reduced considerably, by the creation of a surface area that builds up a damping force. Although in previously employed embodiments only the end face of a stop sleeve and the end face of a magnet core were available as a surface area that generates a damping force, with the embodiment proposed according to the invention a targeted increase in the damping can be achieved.

The damping face, embodied on the side of the magnet core toward the magnet armature, is made of non-magnetic material, such as plastic. Plastic material has the advantage that it can easily be worked. This material can either be glued to the magnet core or cast on it. The easy workability of the plastic material also offers the advantage that the damping performance can be adjusted in a targeted way by the embodiment of an angle relative to the plane end face of the magnet armature. In principle, all materials that have no or only slight effects on the magnetic circuit can be used to produce the damping face.

The damping face can extend on the face end of the magnet core toward the magnet armature both parallel to this face end and at a damping adjustment angle, relative to the end face of the magnet armature. The desired damping behavior can be established by the choice of the damping adjustment angle. Besides a hydraulic damping chamber that opens outward in the radial direction, this damping chamber can also narrow increasingly outward, in terms of the radial direction, relative to the axis of symmetry of the magnet coil and of the magnet armature. An unwanted, premature outflow of the damping fluid (such as fuel) from the hydraulic damping chamber can be avoided by the embodiment of a luglike protrusion on the outside radius of the hydraulic damping chamber. Upon fast opening of the magnet armature, the luglike protrusion acts as a throttling element, and upon an upward motion of the magnet armature, it effects throttling of the flow of the actuating fluid, such as fuel or Diesel fuel, from the hydraulic damping chamber upon opening of the magnet armature. By means of the choice of a non-magnetic material, the magnetic properties of the magnet valve—in particular, the preservation of the remanent air gap—remain unimpaired.

BRIEF DESCRIPTION OF THE DRAWING

The invention is described in further detail below in conjunction with the drawings, in which.

DESCRIPTION OF THE PREFERRED EMBODIMENTS

Figure 1:
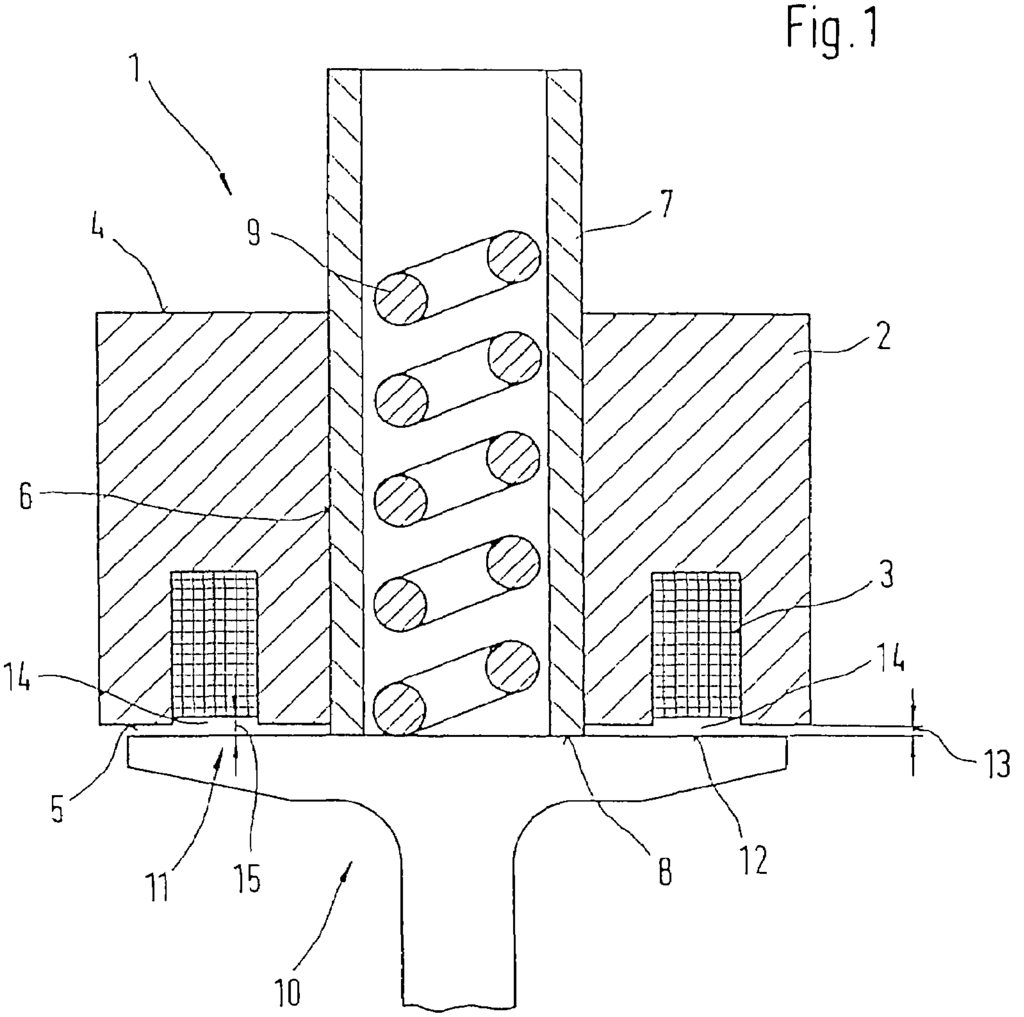
FIG. 1 is an elevation view, in section, of a prior art a magnet valve whose stroke length is defined by a stop sleeve.

As shown in FIG. 1, a magnet valve 1, which is used to actuate a fuel injector for self-igniting internal combustion engines, includes a magnet core 2. A magnet coil 3 is let into the magnet core 2. The magnet core 2 includes a first end face 4 and a second end face 5 that points toward a magnet armature 10. A bore 6 is embodied in the magnet core 2, and a stop sleeve 7 is let into the bore. A face end 8 is embodied on the lower end of the stop sleeve 7 and forms a stop for one face end 12 of an armature plate 11 of the magnet armature 10. The stop sleeve 7 surrounds a closing spring 9, which urges the face end 12 of the magnet armature 10 in the closing direction. The face end 12 of the magnet armature 10 is embodied on its armature plate 11. In the variant embodiment of the magnet valve known from the prior art, the magnet armature 10 is embodied as a one-piece armature; that is, the armature plate 11 and the armature bolt of the magnet armature 10 form a single component. Alternatively, the armature plate 11 of the magnet armature 10 may also be embodied displaceably on the armature bolt. In that case, or in other words with a magnet armature embodied in two parts, the armature plate 11 is acted upon via a spring element which surrounds the armature bolt.

Reference numeral 13 indicates a remanent air gap, which defines the spacing between the second end face 5 of the magnet core 2 and the face end 12 of the armature plate 11 of the magnet armature 10. In the variant embodiment, shown in FIG. 1, of a magnet valve 1 with a stop sleeve 7, the magnet coil 3 is let in on the lower region of the magnet core 2, establishing an annularly configured free space 14 between the underside of the magnet coil and the second end face 5 of the magnet core 2. The height of the annularly configured free space 14 between the underside of the magnet coil 3 and the end face 12 of the armature plate 11 of the magnet armature 10 exceeds that of the remanent air gap 13; the spacing between the magnet coil 3 and the top 12 of the armature plate 11 is identified by reference numeral 15.

In the variant embodiment of a magnet valve shown in FIG. 1, the stroke of the magnet valve 1 is defined via the stop sleeve 7; that is, the face end 8 of the stop sleeve 7 acts as a stop face for the face end 12 of the armature plate 11 of the magnet armature 10, when the magnet valve opens in response to an excitation of the magnet coil 3 and moves upward—in the direction of the stop sleeve 7. Via the relative position of the stop sleeve 7 to the magnet core 2, the remaining remanent air gap 13 between the first end face 5 of the magnet core 2 and the face end 12 of the armature plate 11 can be adjusted with extreme precision. On the other hand, upon the desired fast opening of the magnet valve 1—the opening motion of the magnet armature 10 upon excitation of the magnet coil 3—the face end 12 of the magnet armature 10 strikes (bounces on) the face end 8 of the stop sleeve 7. This phenomenon, also called armature bouncing, has effects on the quantity performance graph, that is, on the injected fuel quantity, plotted over the triggering duration of the magnet coil 3. In the variant embodiment of the magnet valve known from the prior art and shown in FIG. 1, upon opening of the magnet valve 1 a fluid—such as Diesel oil or some other type of fuel—is expelled out of the narrow gap between the face end 8 of the stop sleeve 7 and the face end 12, which upon opening of the magnet armature 10 moves toward the face end 8 of the stop sleeve 7. This creates a force that damps the upward motion of the magnet armature 10. However, since the face end 8 of the stop sleeve 7 is very small, the damping force generated at the face end 8 by the expelled fuel volume does not suffice to prevent bouncing of the magnet armature 10, that is, of the face end 12 of the armature plate 11, on the face end 8 of the stop sleeve 7. The result is an impact of the face end 12 of the armature plate 11 of the magnet armature 10 on the face end 8 of the stop sleeve 7 and recoiling. The armature bouncing of a magnet armature 10 has a major influence on the flight time of the magnet armature from the onset of opening until the ensuing closure of the magnet valve. Because of the flight time of the magnet armature 10, influenced by the armature bouncing, from the onset of opening until the ensuing closure of the magnet armature 10, the fuel volume diverted from a control chamber of the fuel injector is subjected to fluctuations, which can lead to imprecisions in terms of the generation of a reciprocating motion—whether it is an opening or a closing motion—of an injection valve member provided in the fuel injector.

Figure 2:
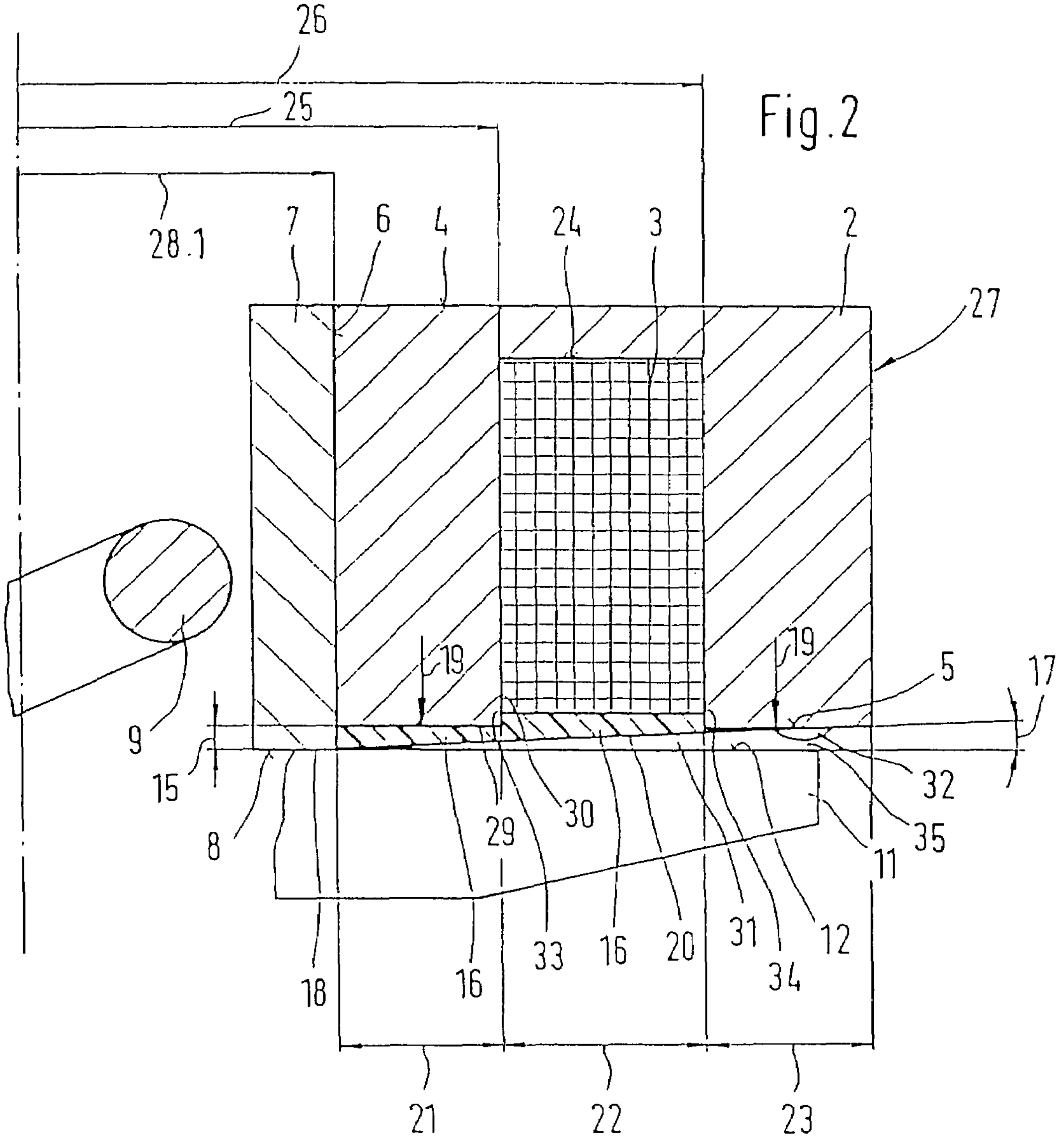
FIG. 2 is a view similar to FIG. 1 but on an enlarged scale of a magnet valve embodied according to the invention, with a magnet core which has a surface area that generates a damping force.

FIG. 2 shows a magnet valve embodied according to the invention, with a magnet core which has a surface area that generates a damping force.

In FIG. 2, a magnet core 2 is seen, shown in half section relative to its axis of symmetry. Analogously to the magnet core 2 as shown in FIG. 1, the magnet core 2 shown in FIG. 2 has both a first end face 4 and a second end face 5. The magnet coil 3 is let into the interior of the magnet core 2. Moreover, the bore 6 in which the stop sleeve 7 is received is embodied on the magnet core 2. The diameter of the bore 6 of the magnet core 2 is identical to an outside diameter 28 of the stop sleeve 7. The stop sleeve 7 in turn includes a closing spring 9, of which only one winding is shown here in section, and which urges a magnet armature 10, shown only in fragmentary form in FIG. 2, in the closing direction.

Of the magnet armature 10 shown in FIG. 1, FIG. 2 shows only the armature plate 11, whose face end is identified by reference numeral 12. Upon opening of the magnet armature 10, an outlet gap 18 for fuel forms between the face end 8 of the stop sleeve 7 and the face end 12 of the armature plate 11 of the magnet armature 10. According to the invention, the outlet gap 18, extending annularly between the face end 8 of the stop sleeve 7 and the face end 12 of the armature plate 11 of the magnet armature 10, discharges into a radially extending hydraulic damping chamber 31.

The hydraulic damping chamber 31 is defined toward the magnet core 2, on the second end face 5 thereof, by a damping face 20, which begins at the outside diameter of the stop sleeve 7 and extends as far as the circumferential surface 27 of the magnet core 2. Moreover, the hydraulic damping chamber 31 is defined by the face end 12 of the armature plate 11 of the magnet armature 10. The damping face 20 toward the magnet armature comprises a non-magnetic material 16, such as plastic material, so as not to impair the magnetic properties of the magnet valve 1. The attainable damping force can be adjusted by means of the geometry of the damping face 20, which generates a damping force that counteracts the opening motions of the armature plate 11 of the magnet armature 10.

On the second end face 5 of the magnet core 2, which faces the face end 12 of the armature plate 11 of the magnet armature 10, the damping face 20 that defines the hydraulic damping chamber 31 can be at a constant spacing 15; that is, fuel emerging parallel to the face end 12 of the armature plate 11 and to the face end 8 of the stop sleeve 7 enters the hydraulic damping chamber 31. In this variant embodiment, the hydraulic damping chamber 31 has a constant cross section extending in the radial direction.

In a further variant embodiment of the hydraulic damping chamber 31, the damping face 20 may be embodied at an angle 17 on the second end face 5 of the magnet core 2. In this variant embodiment, the spacing between the face end 12 of the armature plate 11 of the magnet armature 10 and the damping face 20 on the second face end 5 of the magnet core 2 increases continuously in the radial direction. As a result, it is attained that the fuel flowing into the hydraulic damping chamber 31 from the outlet gap 18 generates a damping force, counteracting the opening motion of the armature plate 11 of the magnet armature 10, that is greater than the damping force that can be generated by only the face end 8 of the stop sleeve 7 (as shown in FIG. 1). By the choice of the angle 17, the surface area that generates the damping force can be increased, and as a result, the damping force that counteracts the opening motion of the magnet armature 10 or of the armature plate 11 can also be increased considerably.

A further variant embodiment of a hydraulic damping chamber 31 provides that a luglike protrusion 32 be made on the damping face 20, on the second end face 5 of the magnet core 2. This luglike protrusion 32 on the second end face 5 of the magnet core 2, when the armature plate 11 of the magnet armature 10 moves upward in the opening direction, effects throttling of the fuel volume flowing out of the hydraulic damping chamber 31, as a result of which the damping force acting on the magnet armature 10, that is, on its armature plate 11, can be increased, since the throttle restriction between the end face 12 of the armature plate 11 and the luglike protrusion 32 becomes smaller and smaller in the course of the opening motion of the magnet armature 10. Because of the reduction in size of the throttle restriction, that is, of the spacing between the face end 12 of the armature plate 11 and the luglike protrusion 32, the fuel volume entering the hydraulic damping chamber 31 through the outlet gap 18 is capable of flowing out of this chamber only in delayed fashion, so that inside the hydraulic damping chamber 31, a damping volume that develops a damping action remains. The outlet opening for the fuel volume flowing out of the damping chamber is identified by reference numeral 35.

The damping face 20, which is made of a non-magnetic material 16, may be either glued to the second end face 5 of the magnet core 2 or cast on the second end face 5 of the magnet core 2. If the damping face 20 is made of a non-magnetic material 16 such as plastic material, then by suitable working of the damping face 20, such as grinding machining, the angle 17 that definitively affects the damping behavior can be adjusted in a targeted way.

The damping face 20 on the second end face 5 of the magnet core 2 includes a first annular face portion 21, which extends from the outside radius 28 of the stop sleeve 7 to the inside radius 25 of the magnet coil 3 inside the magnet core 2. The damping face 20 furthermore includes a second annular face portion 22, which extends from the inside radius 25 of the magnet coil 3 to its outside radius 26, and a third annular face portion 23, which extends from the outside radius 26 of the magnet coil 3 inside the magnet core 2 to the outer circumferential surface 27 of the magnet core 2. Inside the third annular face portion 23, the aforementioned luglike protrusion 32 that develops a throttling action can be embodied on the damping face 20 that defines the annularly configured hydraulic damping chamber 31; with the face end 12 of the armature plate 11, this protrusion defines the outlet opening 35, whose opening cross section is dependent on the stroke length and the speed of motion of the magnet armature 10.

Inside the magnet core 2 of the magnet valve 1 as shown in FIG. 2, the magnet coil 3 is received in an annularly configured recess 24. On the second end face 5 of the magnet core 2, the recess 24 defines a first edge 33 and a second edge 34. In the annular chamber defined by the first edge 33 and the second edge 34, the damping face can be glued in or cast in by positive engagement, so that the damping face is fixed in the radial direction. In the case of the damping face 20 shown in FIG. 2 and embodied at an angle 17 to the end face 12 of the armature plate 11, the first edge 33 creates a graduation 29 of the damping face 20 relative to the second end face 5 of the magnet core 2. Both the graduation and the fixation of the damping face 20 on the second end face 5 of the magnet core 2 by the first edge 33 and the second edge 34 in the radial direction have the effect that the damping face 20 of the magnet core 2 is received in stationary fashion, and when the fuel volume entering the hydraulic damping chamber 31 from the outlet gap 18 shoots in, the damping face remains reliably in position and does not migrate outward in the radial direction. The graduation 29 or 30 of the hydraulic damping face 20 that develops as shown in FIG. 2 relative to the second end face 5 of the magnet core 2 is especially effective if the damping face 20 is made of a non-magnetic material 16, such as plastic material, that is cast on the second end face 5 of the magnet core 2.

As can also be learned from FIG. 2, the luglike protrusion 32 of the damping face 20 on the second end face 5 of the magnet core 2 is preferably attached from above the outer edge of the armature plate 11 of the magnet armature 10. As a result, upon the opening motion of the armature plate 11 in the direction of the luglike protrusion 32, a throttle restriction is formed which decreases continuously in size during the opening motion of the magnet armature 10 or armature plate 11, so that the outflowing fluid through chamber 31, when the magnet armature 10 or armature plate 11 is opening, is forced as a result to flow out through a constantly decreasing cross section in the radial direction. Because of the remaining fuel volume in the hydraulic damping chamber 31, the damping force attainable, which indicated by reference numeral 19 is markedly higher than when there is an unhindered outflow of the fuel volume from the hydraulic damping chamber 31 in the radial direction. Because the damping face 20 that creates the damping force 19 and defines the hydraulic damping chamber 31 is made of a non-magnetic material 16, the magnetic properties of the magnet valve 1 remain unchanged. The damping face 20 is located in the remanent air gap 13 between the second end face 5 of the magnet core 2 and the face end 12 of the armature plate 11 of the magnet armature 10 (see the view in FIG. 1). Because the damping face 20 is embodied of a non-magnetic material 16 in the remanent air gap 13 of the magnet valve 1, the surface area that creates the damping force 19 can be designed such that a targeted amplification of the damping force 19 is established. If a non-magnetic material 16 such as plastic is cast on the second end face 5 of the magnet core 2, then the bouncing behavior of the magnet armature 10 or armature plate 11 can be adjusted in a targeted way by adjusting the angle 17 by means of simple grinding machining.

Figure 3:
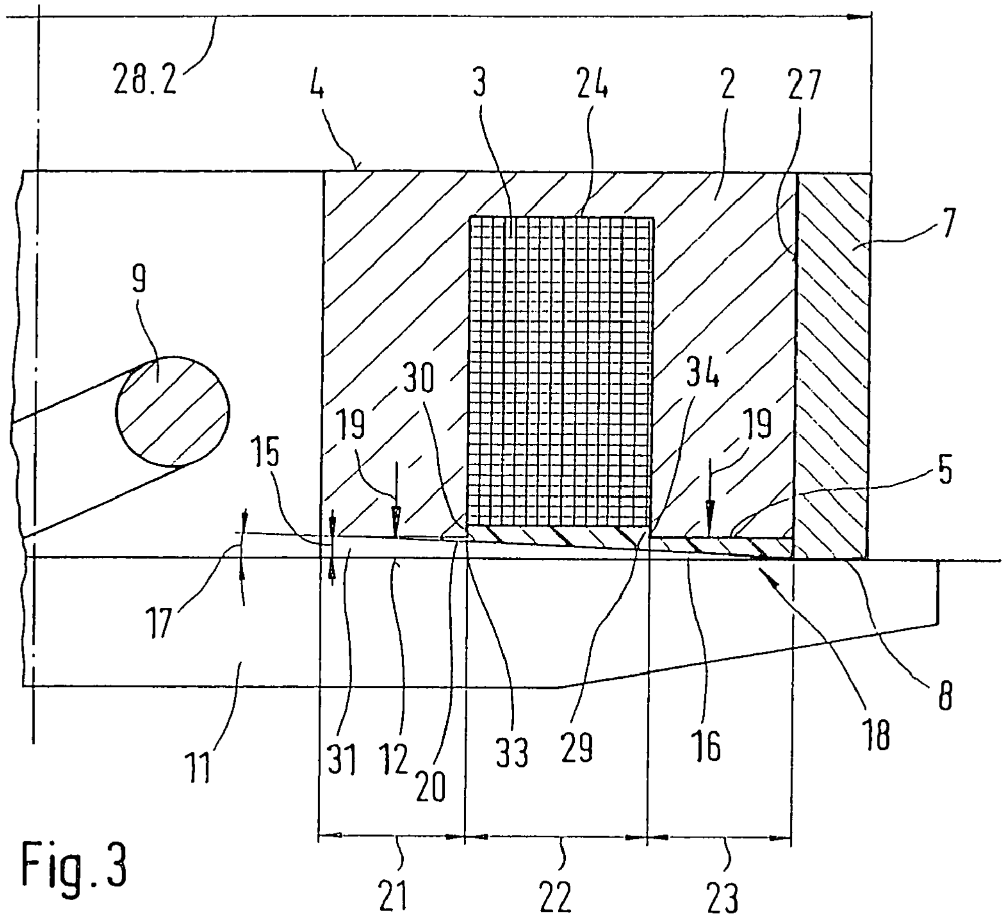
FIG. 3 is a magnet core with a stop sleeve located on the outside.

In FIG. 3, a magnet core with a stop sleeve located on the outside can be seen. The magnet core 2 includes a first, upper end face and a second, lower end face 5. A magnet coil 3 is received in the magnet core 2, in the recess 24. The magnet core 2 as shown in FIG. 3 is surrounded by a stop sleeve 7 that surrounds the outer circumference 27 of the magnet core 2. The end face of the stop sleeve 7 is indicated by reference numeral 8. The magnet core 2, which is embodied essentially annularly, surrounds a closing spring 9, of which only one winding is shown in FIG. 3. The armature plate 11 of a magnet armature is located below the magnet core 2. The armature plate 11 has a face end 12. A non-magnetic filler 16 is received on the second end face 5 of the magnet core 2, and its damping face 20 together with the face end 12 of the armature plate 11 defines the hydraulic damping chamber 31.

The non-magnetic filler 16 extends on the second end face 5 of the magnet core 2 over a first annular face portion 21, over a second annular face portion 22 adjoining the first, and through a third annular face portion 23. The non-magnetic filler 16 has a first step 29 and a second step 30 and can be cast or glued onto the second end face 5 of the magnet core 2. The steps 29 and 30 of the non-magnetic filler 16 form a first edge 33 and a second edge 34, respectively, which engage the recess 24 in the magnet core 2 and secure the non-magnetic filler 16 radially relative to the magnet core 2 by positive engagement.

In the view in FIG. 3, the non-magnetic filler 16 is disposed on the second end face 5 of the magnet core 2 such that a damping adjustment angle 17 is created which extends conversely to the damping adjustment angle 17 shown in FIG. 2. The hydraulic damping chamber 31 thus narrows, viewed in the radial direction, toward the stop sleeve 7 that surrounds the magnet core 2 in its outer circumference 27. The outside radius of the stop sleeve 7 as shown in FIG. 3 is identified—relative to the line of symmetry—by reference numeral 28.2. The damping force which results because of the inflow of fuel into the hydraulic damping chamber 31 that becomes narrower outward, shown in the variant embodiment of FIG. 3, is indicated by reference numeral 19. The spacing 15 identifies the gap height through which fuel flows from the inside of the hydraulic damping chamber 31.

Figure 4:
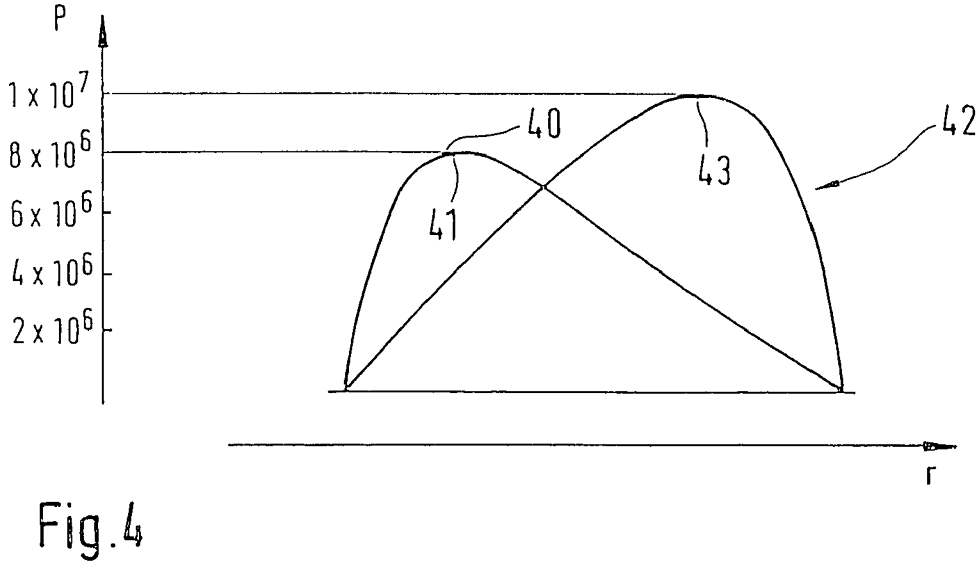
FIG. 4 is pressure distributions in the hydraulic damping chamber, in the variant embodiments of FIGS. 2 and 3.

FIG. 4 compares pressure distributions in the hydraulic damping chamber in the variant embodiments of FIG. 2 and FIG. 3.

In the variant embodiment shown in FIG. 2 of a hydraulic damping chamber 31, which opens toward the outside in terms of the radial direction, a first course of the pressure distribution 40 is established, which is distinguished by a first maximum 41 located farther inward in the radial direction of the hydraulic damping chamber 31. The maximum 41 is located approximately inside the first annular face portion 21 as shown in FIG. 2. By comparison, in the variant embodiment of FIG. 3, a second course of the pressure distribution 42, which is characterized by a second maximum 43. The second maximum 43 of the variant embodiment of FIG. 3 is located inside the third annular face portion 23; that is, it is located where the hydraulic damping chamber 31 is most severely narrowed.

Figure 5:
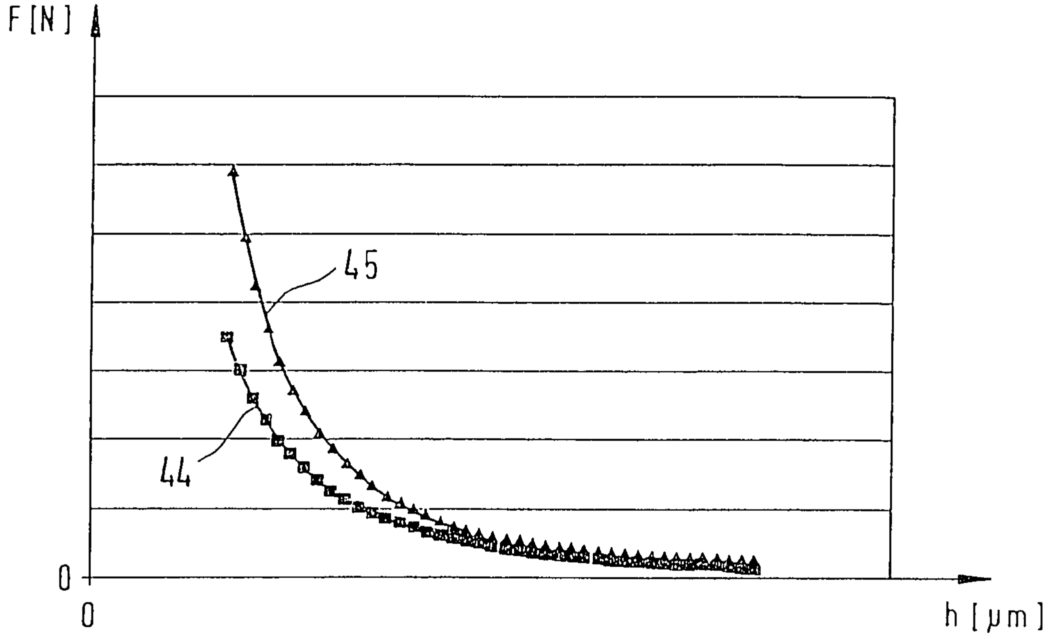
FIG. 5 show the comparison of damping forces that are established in the variant embodiments of FIGS. 2 and 3.

FIG. 5 shows a comparison of the courses of the damping force that are established in the variant embodiments of FIGS. 2 and 3. The courses of the damping force 19 that is established in the hydraulic damping chamber 31 of the variant embodiment in FIG. 2 is identified by reference numeral 44. The course of the damping force established in the hydraulic damping chamber 31 in FIG. 3 is identified by reference numeral 45. The level of the damping force established in the hydraulic damping chamber 31 represented by the first course 44 of the damping force is considerably below the level of the damping force 19 in the second course 45 of the damping force that can be attained with the variant embodiment of FIG. 3. It is true of both courses 44, 45 of the damping force that the damping force decreases steadily with an increasing stroke, taking the remanent air gap into account, and reaches its minimum at the maximum stroke of the armature plate 11 in the direction of the magnet core 2. An estimate of the courses 44, 45 of the damping force can be made for simple geometries using the lubrication gap theory.

$$\eta\frac{\partial^2 u \partial p}{\partial y \partial r},\ u(y=0)=0,\ u(y=h)=0$$

from which, the following is true:

$$U(y) = \frac{\partial p y^2 - h\cdot y}{\partial r \quad 2\eta}.$$

From the above equation, the volumetric flow in the pinch gap is found by integration to be $$\dot{V}(r) = \int_o^h u(y)\cdot dy = -\frac{B\cdot h^3 \partial p}{12\eta \partial r}.$$

The continuity equation leads to a differential equation for the pressure in the gap between the armature plate 11 and the magnet core 2, in accordance with the following equation:

$$\frac{\partial \dot{V}}{\partial r} = -B\cdot v,\ p(r_1)=0,\ p(r_o)=0.$$

In this equation, v is the velocity [speed] of the magnet armature and p is the gap width: B=2π·r. For simple geometries, such as a conical gap as in FIGS. 2 and 3 or a level gap in FIG. 6, the differential equation can be solved analytically.

Figure 6:
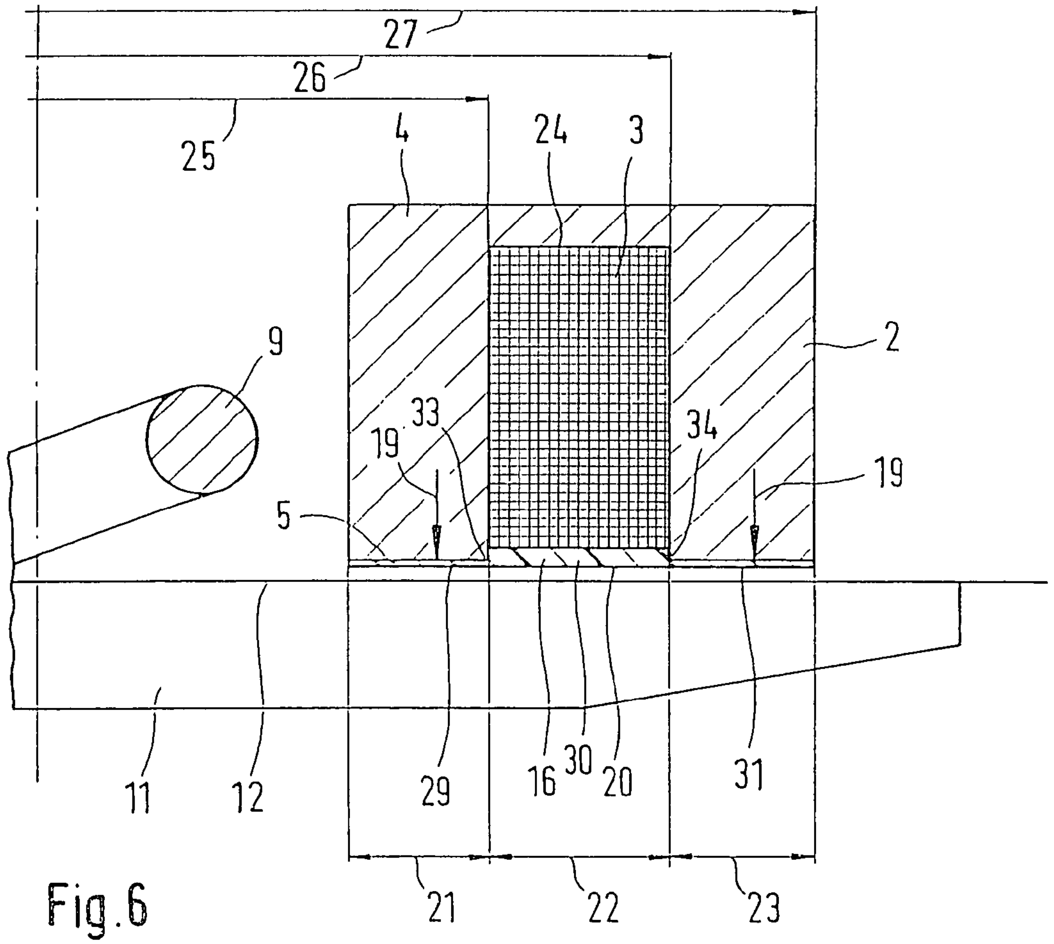
FIG. 6 is a variant embodiment of a magnet core without a stop sleeve.

FIG. 6 shows a variant embodiment of a magnet core that is embodied without a stop sleeve.

It can be seen from FIG. 6 that the second end face 5 of the magnet core 2 is embodied as essentially plane. The magnet coil 3 is let into the recess 24 of the magnet core 2. The magnet coil 3 does not, however, completely fill the recess 24 in the magnet core 2. A non-magnetic filler 16 is cast or glued into the openings in the recess 24 on the second end face 5 of the magnet core 2 and represents a damping face 20 that extends in plane form relative to the face end 12 of the armature plate 11. The non-magnetic filler 16 in the variant embodiment shown in FIG. 6 also has a first step 29 and a second step 30. Because of the graduation of the non-magnetic filler 16, a first edge 33 and a second edge 34 are created, with which the non-magnetic filler 16 is locked on the underside of the recess 24 by positive engagement on the second end face 5 of the magnet core 2. In this variant embodiment, the hydraulic damping chamber 31 has a cross section that extends outward constantly in the radial direction relative to the line of symmetry shown.

Unlike the variant embodiment, shown in FIGS. 2 and 3, of a hydraulic damping chamber 31 between the magnet core 2 and the armature plate 11, the hydraulic damping chamber 31 of FIG. 6 extends at a constant height through the annular face portions 21, 22 and 23. The hydraulic damping chamber 31 is operative only whenever pure liquid is located in the hydraulic damping chamber 31. If there is air or a mixture of air and liquid there, such as foam, then the attainable hydraulic damping, and in particular the first and second courses of the damping force 44 and 45 shown in FIG. 5, are impaired severely.

With the variant embodiments described above, whether they are the embodiment of a damping face 20 extending parallel at a constant spacing 15 between the second end face 5 and the face end 12 of the armature plate 11, or a damping face 20 with an angle 17 or a damping face 20 with a luglike protrusion 32, the quantity performance graph of a fuel injector can be improved considerably, and in particular, a quantity performance graph free of plateaus can be brought about. If a characteristic curve for a particular high-pressure level within a family of characteristic curves has a preinjection plateau, and if within this preinjection plateau the triggering duration is changed, then the quantity of fuel injected into the combustion chamber of the self-igniting internal combustion engine remains constant. The characteristic curves, established by the embodiment proposed according to the invention, for fuel pressures within a family of characteristic curves have a strongly monotonously increasing course, or in other words without any preinjection plateau. This in turn means that when the triggering duration is longer, more fuel will always be injected into the combustion chamber of the engine. This is the fundamental prerequisite for a zero-quantity calibration of a fuel injector. A plateau-free quantity performance graph is especially helpful in zero-quantity calibration of the fuel injector while the vehicle is in operation. Moreover, the embodiment proposed according to the invention of a hydraulic damping chamber 31 between the second end face 5 of the magnet core 2 and the face end 12 of the armature plate 11 of the magnet armature 10 makes it possible to reduce noise during operation of a fuel injector.

The foregoing relates to preferred exemplary embodiments of the invention, it being understood that other variants and embodiments thereof are possible within the spirit and scope of the invention, the latter being defined by the appended claims.

The invention claimed is:

1. A magnet valve for actuating a fuel injector, comprising a magnet core (2), a magnet coil (3) received within an annular recess (24) of the magnet core (2), a closing spring (9) disposed within a bore (6) of the magnet core (2), the closing spring biasing an armature plate (11) of a magnet armature (10) to close the magnet valve, fuel outlet openings (18, 35) being formed between the armature plate (11) and the magnet core (2), an armature bounce reducing damping face (20) applied adjacent to the magnetic coil within the annular recess (24) of the magnet core (2), and a hydraulic damping chamber (31) defined by one end face (12) of the magnet armature (10) on the armature plate (11) and by the armature bounce reducing damping face (20), said fuel outlet openings (18, 35) respectively discharging fuel into and out of said hydraulic damping chamber, and wherein the damping face (20) is comprised of a non-magnetic material (16).

2. The magnet valve of claim 1, wherein the hydraulic damping chamber (31) extends in the radial direction.

3. The magnet valve of claim 2, wherein the damping face (20) has a first annular face portion (21) in the radial direction.

4. The magnet valve of claim 3, wherein the damping face (20) has a second annular face portion (22) in the radial direction, below the magnet coil (3) that is let into the magnet core (2), and wherein between the first annular face portion (21) and the second annular face portion (22), a graduation (29, 30) is formed.

5. The magnet valve of claim 2, wherein the damping face (20) has a second annular face portion (22) in the radial direction, below the magnet coil (3) that is let into the magnet core (2).

6. The magnet valve of claim 1, wherein the hydraulic damping chamber (31) is embodied as an annular chamber.

7. The magnet valve of claim 1, wherein the non-magnetic material (16) is a plastic material.

8. The magnet valve of claim 1, wherein the non-magnetic material (16) is glued to the end face (5) of the magnet core (2).

9. The magnet valve of claim 1, wherein the non-magnetic material (16) is cast on the end face (5) of the magnet core (2).

10. The magnet valve of claim 1, wherein the damping face (20) extends on the end face (5) of the magnet core (2) inside a remanent air gap (13) of the magnet valve (1).

11. A magnet valve for actuating a fuel injector, comprising a magnet core (2), a magnet coil (3) received within an annular recess (24) of the magnet core (2), a closing spring (9) disposed within a bore (6) of the magnet core (2), the closing spring biasing an armature plate (11) of a magnet armature (10) to close the magnet valve, fuel outlet openings (18, 35) being formed between the armature plate (11) and the magnet core (2), an armature bounce reducing damping face (20) applied adjacent to the magnetic coil within the annular recess (24) of the magnet core (2), and a hydraulic damping chamber (31) defined by one end face (12) of the magnet armature (10) on the armature plate (11) and by the armature bounce reducing damping face (20), said fuel outlet openings (18, 35) respectively discharging fuel into and out of said hydraulic damping chamber, and wherein the damping face (20) is comprised of a non-magnetic material (16), wherein the damping face (20) is further embodied of non-magnetic material (16) disposed on an end face (5) of the magnet core (2), oriented toward the magnet armature (10), of the magnet core (2).

12. The magnet valve of claim 11, wherein the damping face (20) extends on the end face (5) of the magnet core (2) at a constant spacing (15) parallel from the end face (12) of the magnet core (2).

13. The magnet valve of claim 11, wherein the damping face (20) extends on the end face (5) of the magnet core (2) at an angle (17) relative to the end face (12) of the magnet armature (10).

14. The magnet valve of claim 13, wherein the damping face (20) is embodied in the end face (5) of the magnet core (2) in inclined fashion relative to the end face (12) of the magnet armature (10) by an angle (17) such that the hydraulic damping chamber (31) opens in the radial direction.

15. The magnet valve of claim 13, wherein the damping face (20) is oriented on the face end (5) of the magnet core (2) relative to the end face (12) of the magnet armature (10) at an angle (17) such that the cross section of the hydraulic damping chamber (31) narrows continuously in the radial direction.

16. The magnet valve of claim 11, wherein the damping face (20), on the end face (5) of the magnet core (2), has a luglike protrusion (32) that defines the hydraulic damping chamber (31).

17. The magnet valve of claim 16, wherein the luglike protrusion (32) is embodied on an annular face portion (23) of the damping face (20).

18. The magnet valve of claim 11, wherein the non-magnetic material (16) is a plastic material.

19. The magnet valve of claim 18, wherein the non-magnetic material (16) is glued to the end face (5) of the magnet core (2).

20. The magnet valve of claim 11, wherein the non-magnetic material (16) is glued to the end face (5) of the magnet core (2).

* * * * *

UNITED STATES PATENT AND TRADEMARK OFFICE

CERTIFICATE OF CORRECTION

PATENT NO. : 7,354,027 B2

APPLICATION NO. : 10/538915

DATED : April 8, 2008

INVENTOR(S) : Michael Mennicken et al.

It is certified that error appears in the above-identified patent and that said Letters Patent is hereby corrected as shown below:

Title page,

Item (30) should read as follows:

(30) Foreign Application Priority Data

| | | | |
|---|---|---|---|
| Feb. 13, 2003 | (DE) | ................ | 1 03 05 985 |
| Dec. 12, 2002 | (DE) | ................ | 1 02 58 442 |

Signed and Sealed this

Fourth Day of November, 2008

JON W. DUDAS

*Director of the United States Patent and Trademark Office*